G. A. CUTTER.
LEVER BRACE.
APPLICATION FILED JAN. 7, 1909.
1,079,912.
Patented Nov. 25, 1913.
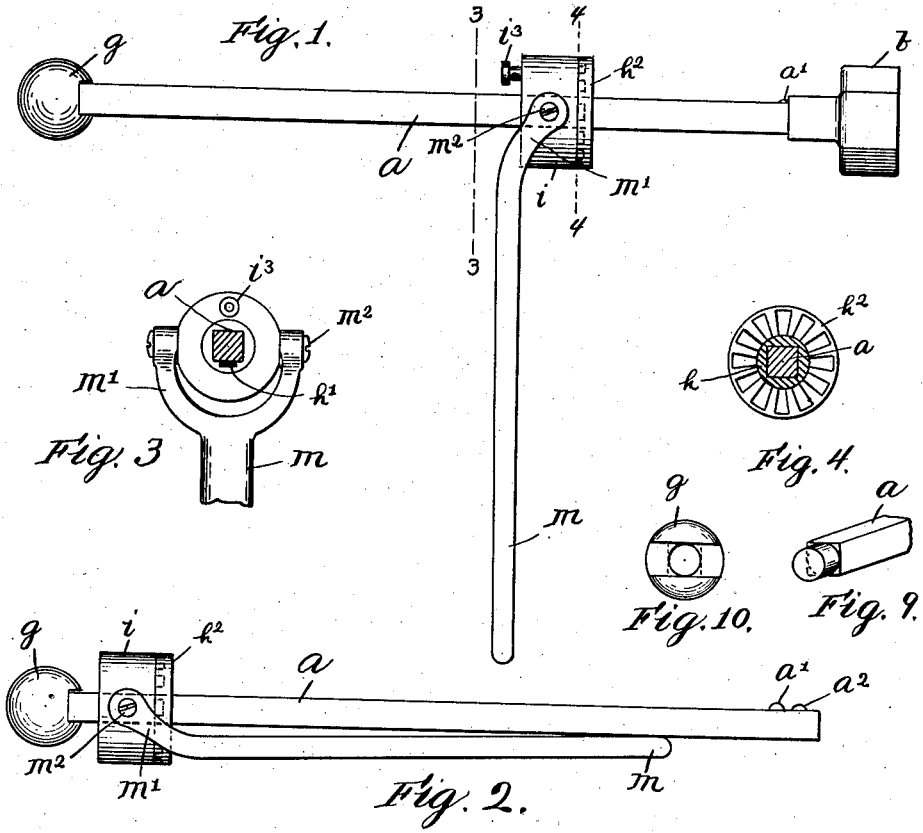
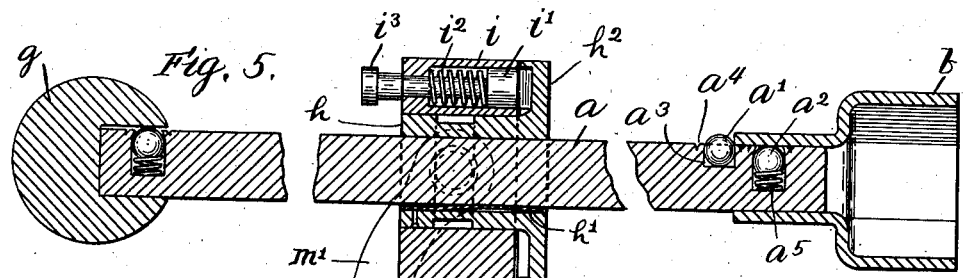
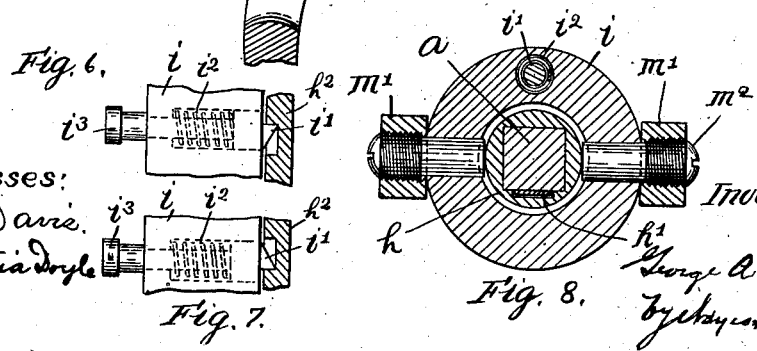
Witnesses:
H. B. Davis.
Cynthia Doyle.
Inventor:
George A. Cutter
by Esby and Lannan
attys.

UNITED STATES PATENT OFFICE.

GEORGE A. CUTTER, OF TAUNTON, MASSACHUSETTS, ASSIGNOR TO CHARLES A. STONE, OF PLYMOUTH, MASSACHUSETTS, EDWIN S. WEBSTER, OF NEWTON, MASSACHUSETTS, RUSSELL ROBB, OF CONCORD, MASSACHUSETTS, HENRY G. BRADLEE, OF BROOKLINE, MASSACHUSETTS, AND ELLIOT WADSWORTH, OF BOSTON, MASSACHUSETTS, COPARTNERS AS FIRM OF STONE & WEBSTER, OF BOSTON, MASSACHUSETTS.

LEVER-BRACE.

1,079,912.  Specification of Letters Patent.  Patented Nov. 25, 1913.

Application filed January 7, 1909. Serial No. 471,076.

*To all whom it may concern:*

Be it known that I, GEORGE A. CUTTER, of Taunton, county of Bristol, State of Massachusetts, have invented an Improvement in Lever-Braces, of which the following is a specification.

This invention relates to lever-braces, and has for its object to construct an improved form of ratchet-head by means of which the brace is turned; also to construct a ratchet-head adapted to be slidably arranged on the shank of the brace, so that it may be set at any point intermediate the length of said shank, and a lever-handle pivotally connected to it adapted to be held at an angle with respect to the shank of the brace, and while so held to operate the ratchet in any position it may occupy on the shank, said lever-handle being also movable into parallelism with the shank, and adapted to be employed to move the ratchet-head along on the shank.

Figure 1 is a side elevation of a lever brace embodying this invention. Fig. 2 is a side view of the same, the parts being in their out-of-use positions. Fig. 3 is a cross-section of the parts shown in Fig. 1 taken on the dotted line 3—3. Fig. 4 is a cross-section of the parts shown in Fig. 1 taken on the dotted line 4—4. Fig. 5 is an enlarged longitudinal vertical section of the lever brace. Figs. 6 and 7 are details of the reversible dog borne by the driving-member of the ratchet-head. Fig. 8 is an enlarged cross-sectional detail of the ratchet-head showing particularly the pivotal connection of the handle therewith. Fig. 9 is a detail showing the end of the shank. Fig. 10 is a detail showing the hand-piece.

$a$ represents the shank of the brace which is made of any suitable length and square or other than round in cross-section. It may be made by simply cutting bar stock which is common on the market, to a suitable length. It is adapted to receive upon it at one end any suitable tool or tool-holder. In Figs. 1 and 5 a nut-engaging socket $b$ is placed upon it. In all instances the member which is placed on the end of the shank $a$ has a socket corresponding in shape and dimensions to the end of the shank on which it is placed, and said shank has a fixed stop $a'$ and a friction-device $a^2$ for respectively determining the position of the member on the shank and for assisting in holding it thereon.

As herein shown, the fixed stop $a'$ consists of a ball set in a socket $a^3$ formed in the shank, which protrudes therefrom a short distance, and which is held therein by cutting the shank concentrically around the socket to form a lip $a^4$ and forcing inward the lip thus formed to thereby contract the mouth of the socket. As herein shown, the friction-device $a^2$ also consists of a ball set in a socket in the shank upon a spiral spring $a^5$, which acts to thrust outward the ball, and around said socket a lip is formed which is turned inward to hold the ball in its socket. The spring-pressed ball frictionally engages the member which is placed upon the end of the shank. My invention, however, is not limited to the employment of either a fixed stop or a friction-device, or to the construction of said elements. As herein constructed, however, they are efficient and are easily and cheaply manufactured.

The shank $a$ is designed to be held pressed against the object to be turned or otherwise operated, and while so held to be turned, and to provide for thus holding said shank it is provided at its outer end with a spherical or other form of hand-piece $g$. The hand-piece is herein shown as detachable and hence is formed with a socket to receive the end of the shank $a$, and the end of the shank which enters the socket in the hand-piece is provided with a friction-device similar to the friction-device heretofore described. A detachable hand-piece is of particular advantage when the shank $a$ is made of commercial bar stock. To cheaply provide the spherical hand-piece with a socket it is herein shown as formed with a recess, see Fig. 10, having parallel sides and a flat bottom and with a cylindrical hole at the bottom of said recess, and the end of the shank $a$ is made cylindrical, see Fig. 9. The squared portion of the shank enters the parallel sided recess and the cylindrical portion thereof enters the cylindrical hole.

As a means of turning the shank $a$ a ratchet-head is arranged thereon, and herein said head is slidably connected therewith, so that it may be moved along thereon and set at any point intermediate its length, as may be required. The ratchet-head, see Fig. 5, consists of a collar $h$ having a toothed engaging-portion, which constitutes the driven-member, and a ring $i$ mounted on said collar having a dog for engaging the toothed portion thereof, which constitutes the driving-member. The collar $h$ has a bore of the same shape and dimensions as the transverse section of the shank $a$, so as to receive said shank and slide along thereon to occupy any position thereon intermediate its length, and when turned to turn the shank with it. A flat spring $h'$ is placed in the bore of the collar which frictionally engages the shank $a$ and thereby assists in holding the collar in whatever position it may be set. The collar is formed with or comprises a cylindrical portion on which the ring $i$ is mounted and an outwardly extended flange $h^2$ at one end thereof, one side of which is formed with a set of teeth adapted to be engaged by the dog on the ring. The teeth are herein shown as formed by forming multi-sided indentations in one side of the flange, see Fig. 4. The ring $i$ is made to fit loosely upon the cylindrical portion of the collar and to abut against the flange thereof, and it has a hole through it longitudinally for the dog $i$. The dog is pressed outward by a spring $i^2$ which is contained in the hole in the ring, so that its end is adapted to project from the ring and enter the interdental spaces on the flange and to engage the teeth thereof. Said dog has a beveled end in order that it may slip freely over the teeth during the backward movement of the ring. Said dog is also reversible in the hole in the ring, so that it may be set to engage either side of the teeth and slip over the adjacent tooth as the ring is turned. The stem of the dog has a knurled head $i^3$ which may be engaged by the fingers for the purpose of turning it to reverse its position in the hole.

A handle $m$ is connected with the ring $i$ which may be employed as a means for reciprocating it rotarily. As herein shown said handle is made as a lever which is formed with a bifurcated end portion $m'$, adapted to embrace the ring and to be pivotally connected thereto at diametrically opposite points. $m^2$, $m^2$, represent the pivot-pins which extend through the arms of the bifurcated end portion of the handle and also through the ring, and, as herein shown, see Fig. 8, they project from the inside of the ring and enter a circumferential groove formed in the cylindrical portion of the collar. Said pivot-pins thereby not only pivotally support the handle, but also prevent endwise movement of the ring with respect to the collar and permit rotary movement thereof.

In using the implement, the ratchet-head will be moved along on the shank to the desired point and the handle swung into operative position, being adapted to be held at any desired angle with respect to the shank. The handle is then oscillated to reciprocate rotarily the ring and thereby turn the collar and the shank to which said collar is connected. The ratchet-head may be detached from the shank if desired, or it may remain thereon and the handle swung into parallelism with the shank as shown in Fig. 2, said handle being bent near its inner end to provide for thus arranging the handle with respect to the shank.

Having thus described my invention, what I claim as new and desire to secure by Letters Patent is:—

A lever brace including a bar of angular contour, and a ratchet head slidably mounted on said bar, said head including a collar formed with a longitudinal bore corresponding in size and shape to the transverse dimensions of the bar, an annular flange projecting at right angles from one end of the collar and formed with a series of teeth, said collar beyond the flange being formed with an annular recess, a ring rotatably fitting the collar beyond the flange, a handle, and pivot pins uniting the handle and ring, said pins seating in the recess in the collar and securing said ring and collar against other than independent rotary movement.

In testimony whereof, I have signed my name to this specification, in the presence of two subscribing witnesses.

GEORGE A. CUTTER.

Witnesses:
B. J. NOYES,
H. B. DAVIS